United States Patent
Huang

[19]

[11] Patent Number: 5,809,654
[45] Date of Patent: Sep. 22, 1998

[54] TREE PRUNER

[76] Inventor: Show-Zuh Huang, P.O. Box 453, Taichung, Taiwan

[21] Appl. No.: 884,010

[22] Filed: Jun. 27, 1997

[51] Int. Cl.[6] .................................................. B26B 17/00
[52] U.S. Cl. ............................................. 30/134; 30/250
[58] Field of Search .............................. 30/134, 135, 251, 30/250

[56] References Cited

U.S. PATENT DOCUMENTS

| | | | |
|---|---|---|---|
| 119,485 | 10/1871 | Warner | 30/135 |
| 4,094,064 | 6/1978 | Nishikawa et al. | 30/251 |
| 5,117,557 | 6/1992 | Hartley | 30/135 |
| 5,461,784 | 10/1995 | Baron | 30/134 |
| 5,566,453 | 10/1996 | Lin | 30/134 |

Primary Examiner—Hwei-Siu Payer

[57] ABSTRACT

A tree pruner consists of a fixed jaw member, a movable arm and a movable jaw. The fixed jaw member has a jaw portion and a fixed arm. The movable jaw has a blade and a crank. The fixed jaw member and the movable jaw are fastened pivotally such that the blade of the movable jaw and a cutting portion of the fixed jaw member cooperate to execute efficiently the pruning of a tree twig when the movable arm is moved towards the fixed arm of the fixed jaw member.

3 Claims, 5 Drawing Sheets

TREE PRUNER

FIELD OF THE INVENTION

The present invention relates generally to a gardening tool, and more particularly to the gardening tool intended to prune a tree.

BACKGROUND OF THE INVENTION

The conventional tree pruners are generally defective in design in that they can not be used to execute the pruning job efficiently, and that their blades can not be located easily on the twigs intended to be pruned, and further that a pruned twig is caught and retained easily in the gap located between the two blades of the tree pruners.

SUMMARY OF THE INVENTION

The primary objective of the present invention is to provide an improved tree pruner which is free from the drawbacks of the conventional tree pruners described above.

In keeping with the principle of the present invention, the foregoing objective of the present invention is attained by an improved tree pruner, which is mainly composed of a fixed jaw member, a movable arm, and a movable jaw. The fixed jaw member has a jaw portion and a fixed arm. The movable jaw has a blade and a crank. The fixed jaw member and the movable jaw are fastened pivotally such that the blade of the movable jaw and a cutting portion of the fixed jaw cooperate to execute efficiently the pruning of a twig when the movable arm is moved in the direction towards the fixed arm.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
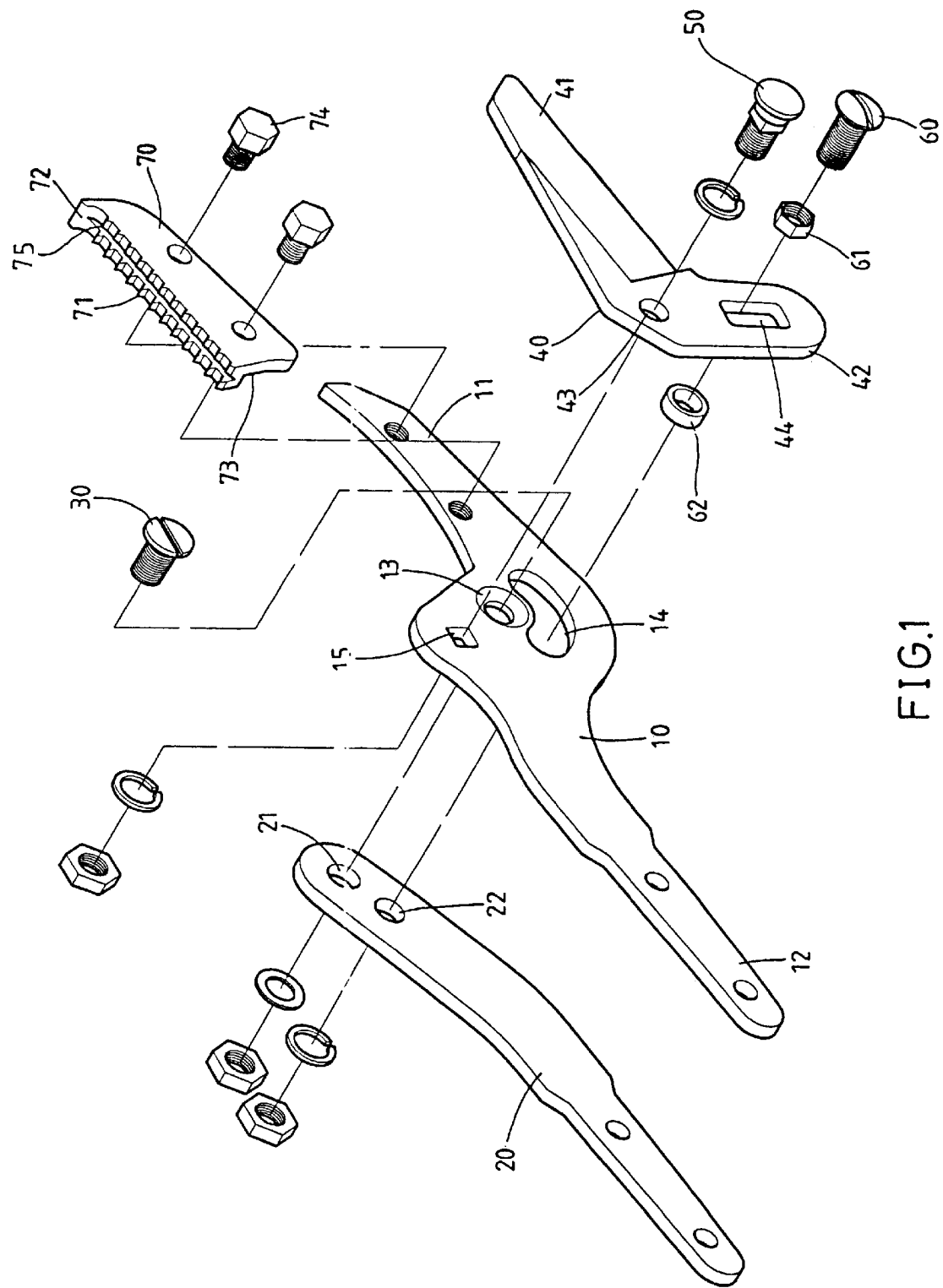
FIG. 1 shows an exploded view of the embodiment of the present invention.
Figure 2:
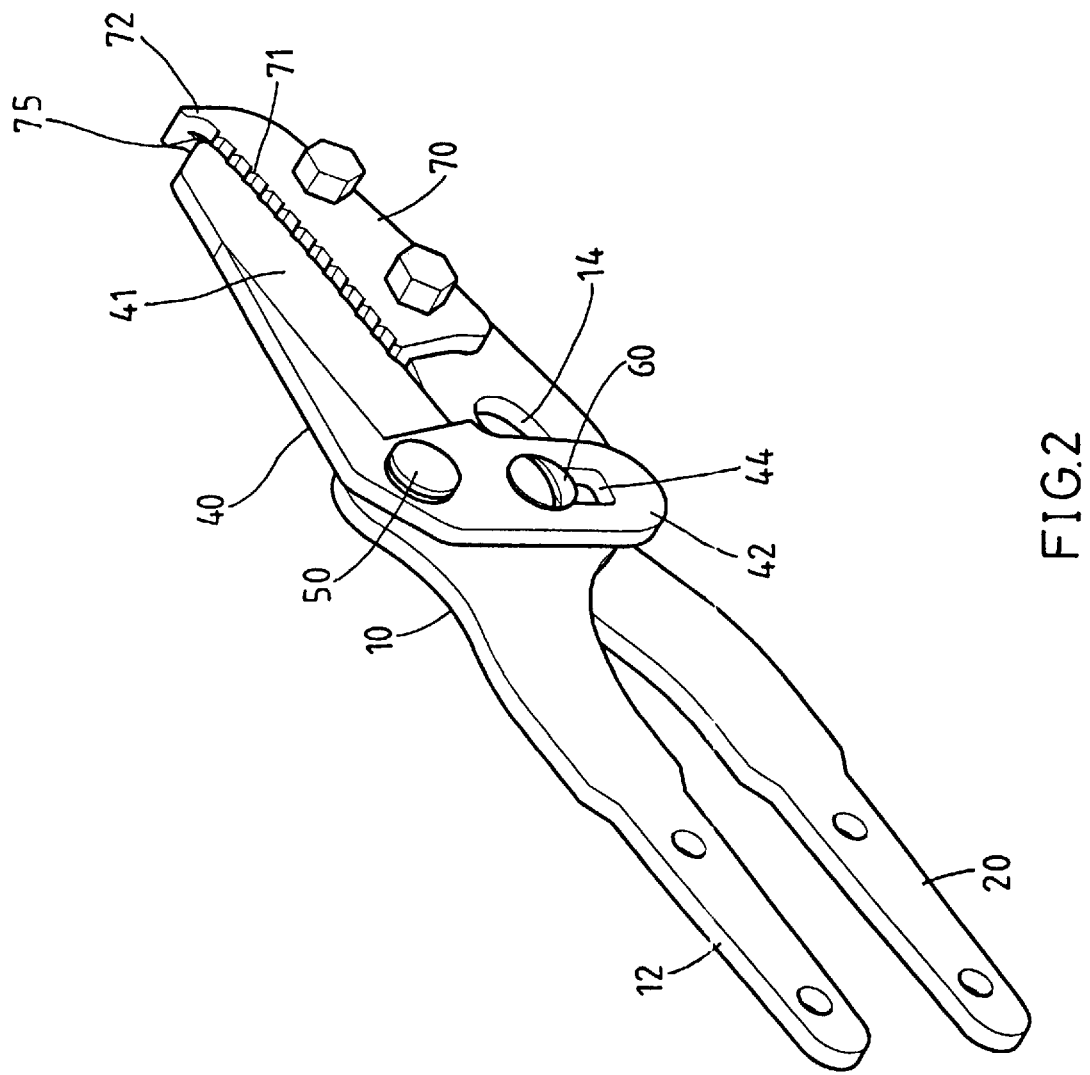
FIG. 2 shows a perspective view of the embodiment in combination according to the present invention.

As shown in all drawings provided herewith, a tree pruner embodied in the present invention is composed of component parts which are described explicitly hereinafter.

A fixed jaw member 10 has a jaw portion 11 located at one end thereof, a fixed arm 12 located at another end thereof, a sunk shaft hole 13, an arcuate slot 14 located under the sunk shaft hole 13, and a pivoting hole 15 located over the sunk shaft hole 13.

A movable arm 20 is provided with a shaft hole 21 corresponding in location to the sunk shaft hole 13 of the fixed jaw member 10. The movable arm 20 is further provided with a bolt hole 22 corresponding in location to the arcuate slot 14 of the fixed jaw member 10.

A main bolt 30 is engaged with the sunk shaft hole 13 of the fixed jaw member 10 and the shaft hole 21 of the movable arm 20 such that the main bolt 30 is concealed in the shaft hole 13.

A movable jaw 40 has a blade portion 41 and a crank 42 extending from one end of the blade portion 41. The crank 42 is provided with a hole 43 and a slide slot 44 contiguous to the free end of the crank 42.

An auxiliary bolt 50 is used to fasten pivotally the movable jaw 40 with the fixed jaw member 10 such that the auxiliary bolt 50 is engaged with the hole 43 of the crank 42 of the movable jaw 40 and the pivoting hole 15 of the fixed jaw member 10.

A linking bolt 60 is used to link the movable jaw 40, the fixed jaw member 10 and the movable arm 20 such that the linking bolt 60 is engaged with the slide slot 44 of the movable jaw 40, the arcuate slot 14 of the fixed jaw member 10, and the bolt hole 22 of the movable arm 20.

A cutting member 70 has a toothed portion 71 extending throughout the upper side thereof. The toothed portion 71 is provided at one end thereof with a stop edge 72, and at another end thereof with a contact portion 73. The toothed portion 71 is provided with a groove 75 extending along the direction of the longitudinal axis of the toothed portion 71 and corresponding in location to the blade portion 41 of the movable jaw 40. The cutting member 70 is fastened with the jaw portion 11 of the fixed jaw member 10 by means of two fastening bolts 74.

Figure 3:
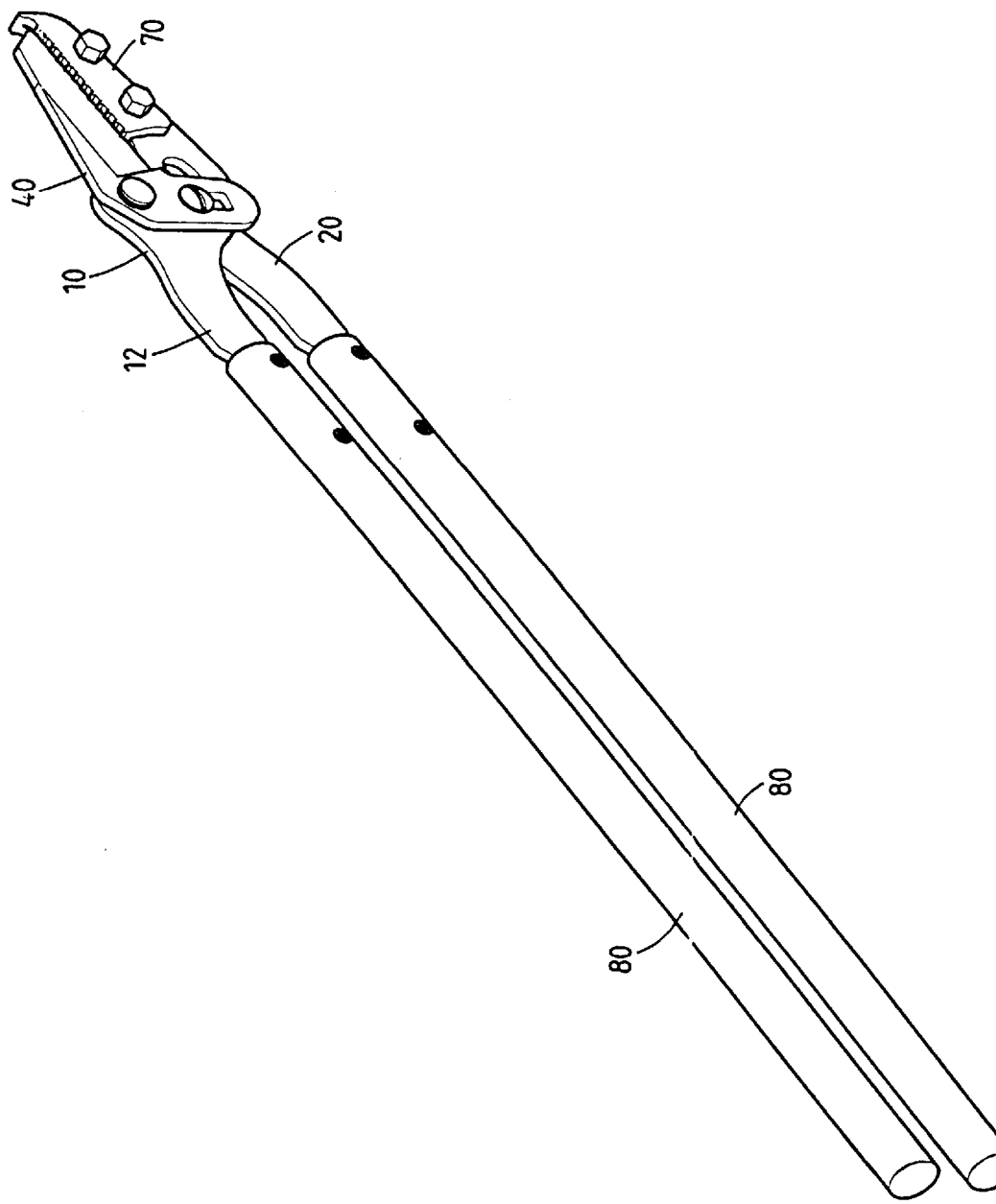
FIG. 3 shows another perspective view of the embodiment in combination according to the present invention.
Figure 4:
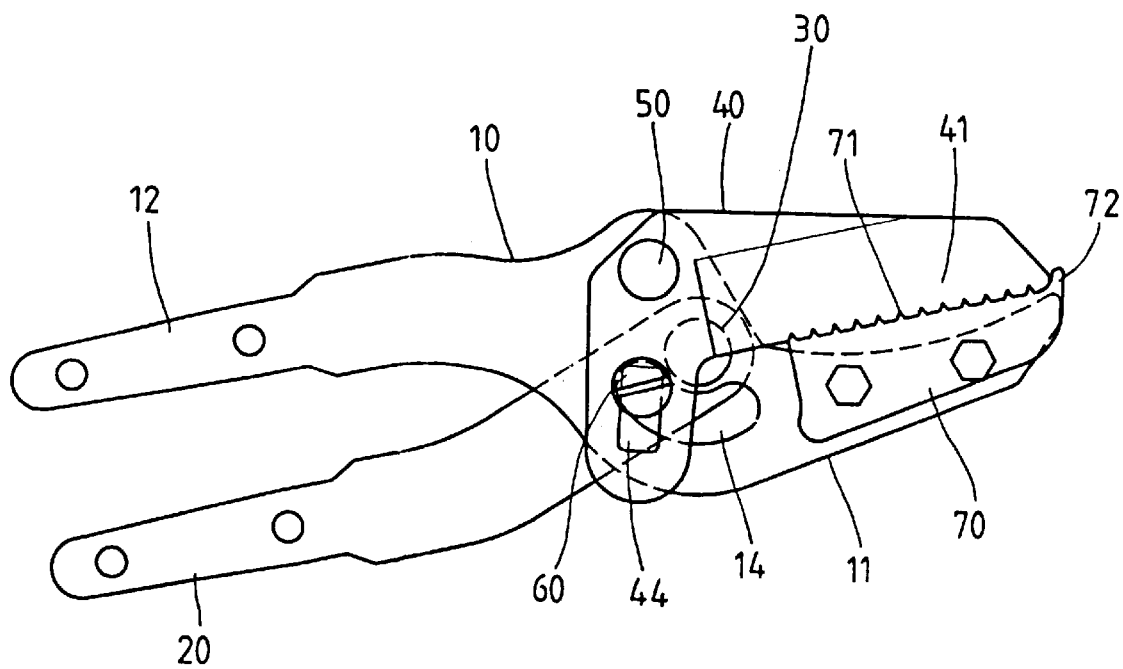
FIG. 4 shows a side schematic view of the present invention at work.

The movable arm 20 is fastened pivotally with the fixed arm 12 of the fixed jaw member 10 by the main bolt 30 such that the movable arm 20 is capable of driving the linking bolt 60 to move in the arcuate slot 14, thereby enabling the blade portion 41 of the movable jaw 40 to cooperate with the cutting portion 70 of the fixed jaw member 10 to execute the pruning action of a twig. The linking bolt 60 is provided with a guide sleeve 61 and a bushing 62. The fixed arm 12 of the fixed jaw member 10 and the movable arm 20 are provided respectively with a long handle 80 fastened therewith, as shown in FIG. 3.

Figure 5:
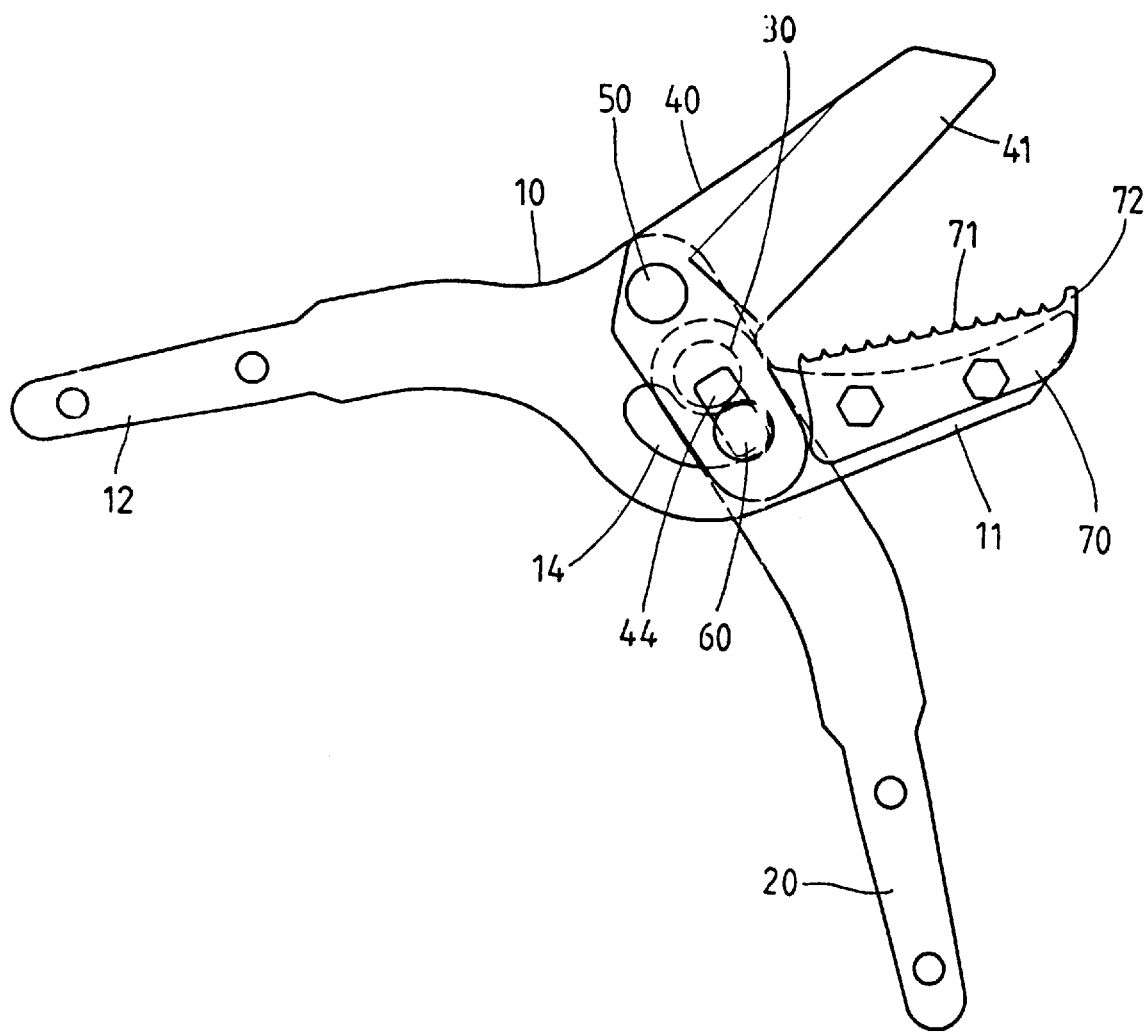
FIG. 5 shows a schematic view of the present invention at work.

In operation, the movable arm 20 can be swiveled on the main bolt 30 such that the linking bolt 60 is driven to slide within the confine of the arcuate slot 14 of the fixed jaw member 10. In the meantime, the blade portion 41 of the movable jaw 40 is actuated to swivel on the auxiliary bolt 50 in the direction away from the cutting member 70 of the fixed jaw member 10, as illustrated in FIG. 5. A twig intended to be pruned is then held between the blade portion 41 and the toothed portion 71 of the cutting member 70. As two handles 80 are moved towards each other, the pruning of the twig is executed by the blade portion 41 in conjunction with the toothed portion 71 of the cutting member 70. It must be pointed out here that the twig is held securely by the teeth of the toothed portion 71, and that the twig is prevented from slipping out by the stop edge 72 of the cutting member 70.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A plant pruner comprising:
   a fixed jaw member having a jaw portion, a fixed arm opposite in location to said jaw portion, a sunk shaft hole, an arcuate slot located by said shaft hole, and a pivoting hole opposite in location to said arcuate slot;

a movable arm having a shaft hole corresponding in location to said sunk shaft hole of said fixed jaw member, said movable arm further having a bolt hole corresponding in location to said arcuate slot of said fixed jaw member;

a main bolt which is engaged with said sunk shaft hole of said fixed jaw member and said shaft hole of said movable arm such that said movable arm is fastened pivotally with said fixed jaw member;

a movable jaw having a blade portion, a crank extending from one end of said blade portion, a hole corresponding in location to said pivoting hole of said fixed jaw member, and a slide slot corresponding in location to said arcuate slot of said fixed jaw member;

an auxiliary bolt which is engaged with said hole of said movable jaw and said pivoting hole of said fixed jaw member such that said movable jaw is fastened pivotally with said fixed jaw member;

a linking bolt which is engaged with said slide slot of said movable jaw, said arcuate slot of said fixed jaw member and said bolt hole of said movable arm such that said movable jaw, said fixed jaw member and said movable arm are linked; and a cutting member having a toothed portion which is provided at a free end thereof with a stop portion for preventing a plant twig from slipping out of said toothed portion, said cutting member further having a plurality of fastening holes for fastening said cutting member with said jaw portion of said fixed jaw member.

2. The plant pruner as defined in claim 1, wherein said linking bolt is provided with a guide sleeve fitted thereover, and a bushing fitted thereover.

3. The plant pruner as defined in claim 1, wherein said fixed arm of said fixed jaw member is provided with a first handle fastened therewith; and wherein said movable arm is provided with a second handle fastened therewith, said second handle being similar in construction and length to said first handle.

\* \* \* \* \*